Feb. 28, 1967 J. ZUMETA ETAL 3,306,155

BRAIDED PACKING MATERIAL

Filed June 23, 1964

INVENTORS
JULIO ZUMETA
EDWARD M. CASE
BY Blum, Moscovitz, Friedman, Blum & Kaplan
ATTORNEYS 3,306,155
BRAIDED PACKING MATERIAL Julio Zumeta, New York, N.Y., and Edward Murray Case, Weston, Conn., assignors to The Marlo Company, Inc., New York, N.Y.

Filed June 23, 1964, Ser. No. 377,236
9 Claims. (Cl. 87—1)

The present invention deals with a new packing material for use as a packing for pumps and the like. More particularly, it deals with a packing material characterized by glass braids impregnated with polytetrafluoroethylene resin ("Teflon"), particularly such a structure further enclosed in a polytetrafluoroethylene jacket.

Considerable difficulty has been encountered with respect to supplying a packing for mechanical pumps and the like which is able to withstand highly corrosive chemicals as well as the high temperatures generated by mechanical friction, and/or normal processing temperatures of the material passing through the pump. While various types of packing have been disclosed, including those utilizing polytetrafluoroethylene as a component, there has been substantial difficulty in obtaining a packing material having the desired properties. Thus the use of woven cloth or glass felt material impregnated with polytetrafluoroethylene has been suggested, but this material is relatively brittle and does not stand excessive flexing. Similarly, polytetrafluoroethylene packing as such, is a notoriously poor heat conductor and does not stand up under the temperatures generated by friction, etc.

In accordance with the present invention a highly specific packing material is taught which offers excellent heat dissipation as well as sealing a pump and the like from leaking, etc. More particularly, in one embodiment of the present invention, long glass fibers are braided (preferably after being twisted into stands) so that the fibers are continuous from the inner surface (where there is rubbing action between the shaft and packing) to the outer surface of the packing mass. The packing is impregnated with a polytetrafluoroethylene aqueous dispersion so that the polytetrafluoroethylene seeps into the interstices between the braided glass fibers thus sealing off the interstices in the mass of the packing as well as providing lubrication between the fibers in the body of the packing and on the surface between the packing and the shaft. As an alternative method of impregnating the glass fibers the individual fibers or the strands of several fibers are impregnated prior to processing into the braided structure after which the complete packing then receives a second immersion in the dispersion.

The combination of the braided glass fibers impregnated with polytetrafluoroethylene offers channels of heat dissipation by virtue of the braided glass structure, as well as the nature of glass fibers; is capable of withstanding high temperatures; is inert; and has excellent mechanical properties due to the braided fiber glass structure as well as the polytetrafluoroethylene filling the interstices of the fibers. Further, it offers a springiness that is absent in either solid polytetrafluoroethylene or in dry braided glass fibers.

While polytetrafluoroethylene as such is preferred, similar inert polymers such as monochlorofluoroethylene polymers ("Kel-F") can be used with similar advantages. Means for adapting such polymers to use in accordance with this invention will readily suggest themselves to those skilled in the art. Additionally, while not generally preferred, impregnation may be effected in whole or in part as a dry impregnation with polymer powder (and possibly binding agents).

The present packing material thus is superior to polytetrafluoroethylene packing as such, which due to its low thermal conductivity retards the transfer of heat generated on the rubbing surfaces as well as creating excessive thermal expansion. Further, the use of glass fibers alone even in the braided structure permits seepage of the substances being sealed or packed, and the mechanical rubbing of the fiber upon other fibers would soon reduce the glass to powder.

The present packing material thus extends the practical temperature limits at which the packing can be applied since, though the upper limit is the temperature resistance level of polytetrafluoroethylene itself, the glass braiding conducts heat away from this surface on which it is generated, thereby tending to maintain a temperature below the point at which polytetrafluoroethylene deteriorates. The relatively long glass fibers, e.g. over 1 inch and generally 8 to 15 inches in length, go from the inside of the packing to the outside normally making several revolutions thereabout and thus providing heat channels from an inner point in the packing to the outer surface. In the low temperature range, mechanical properties of the present construction permit its employment where polytetrafluoroethylene itself would not be satisfactory.

It is further noted that the present construction offers advantages over an asbestos core impregnated with polytetrafluoroethylene. The present construction offers better mechanical properties and better resistance to elevated temperatures due to friction since asbestos is a heat barrier and does not offer the heat advantages offered by the present construction, and is not as inert as the braided glass fibers of the present packing material.

In one embodiment of the present invention a packing material is formed by impregnating braided glass fibers with polytetrafluoroethylene (or monochlorofluoroethylene polymer) and thereafter using it as a core by surrounding it with a jacket composed of braided polytetrafluoroethylene filaments (or monochlorofluoroethylene polymer filaments). The outer braids are normally further impregnated with fluoroethylene polymer in the same manner as the core.

This structure is particularly advantageous since the polytetrafluoroethylene outer jacket provides lubrication tending to reduce the build-up of temperatures due to friction. It encapsulates the springy polymer treated glass fiber core in a jacket of pure polymer fibers which are then further impregnated. This construction is advantageous in those cases where the fluid being packed may be injurious to glass but not to fluoroethylene polymer.

Further, it is preferred to utilize braided glass fibers formed by taking a number of individual fibers, especially where each is already individually twisted, and forming a twisted bundle of the yarn. The yarns may then be braided in a customary manner and subjected to impregnation with Teflon. By utilizing this procedure an additional springiness is imparted to the packing material.

It is to be noted that the present structure utilizes long glass fibers formed into a braided structure. It is thus distinguished over felt-like structures which are brittle when impregnated. Further, it is distinguished over asbestos structures since asbestos fibers are short, and in order to form fibers sufficient for spinning they normally must be used in combination with other fibers such as cotton, thereby reducing the range of chemical resistance of the resultant product. These short fibers, such as asbestos, do not offer the high heat conductivity of the present braided structure formed from long glass fibers, and moreover inherently are of poor heat conductivity characteristics.

Basically, the process for making the present packing material involves formation of braided glass fibers and impregnating them in a suitable polytetrafluoroethylene suspension or suspensoid, drying the resultant impregnated braided fibers, and thereafter calendering or otherwise treating the impregnated material to process it to final size. The various aspects and modifications of the present invention will be made more clearly apparent by reference to the following discussion, drawings and accompanying examples.

Figure 1:
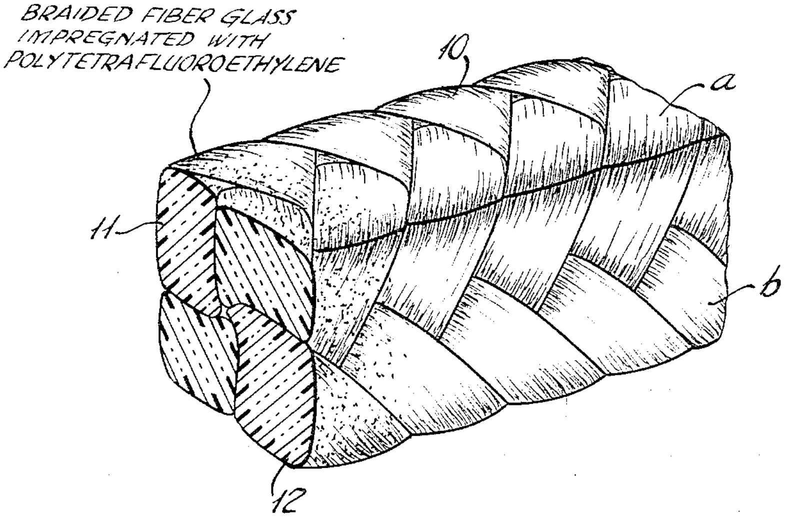
FIG. 1 illustrates a packing structure wherein braided glass fibers are impregnated with polytetrafluoroethylene.

As shown in FIG. 1, the basic packing structure 10 of the present invention consists of braided long glass fibers 11 impregnated with polytetrafluoroethylene particles, the polymer particles surrounding the glass filament braids as well as entering the interstices between the fibers. The glass fiber braids *a* and *b* can be formed by any variety of conventional techniques. However, it is preferred to first twist the individual relatively long glass fibers to form a braiding rope and then overlap it with other twisted fibers to form a braided structure. A particularly preferred procedure is taking individually twisted glass fibers and making a twisted bundle of a number of the fibers and utilizing the twisted bundle in the formation of braids *a* or *b*. In another embodiment, individual fibers or a bundle of fibers may first be impregnated prior to braiding, and the braids then further impregnated.

Any of the conventional types of braids, e.g. twisted, square, interlocking, braid-over-braid, etc. can be employed, utilizing conventional techniques for forming same, such as is described in the Handbook of Mechanical Packings and Gasket Material, 1960 (Library of Congress Catalogue 60–16524) issued by the Mechanical Packing Association, 17 John St., New York, N.Y. Square braids are preferred for the basic impregnated glass fiber structure (and braid-over-braid for the polytetrafluoroethylene jacket if it be used).

After making the braided structure, it is then impregnated with polytetrafluoroethylene normally by the use of an aqueous polytetrafluoroethylene dispersion or suspension. Generally polytetrafluoroethylene aqueous dispersions, as supplied by the polymer manufacturer, contain 30 to 70% polytetrafluoroethylene based on total composition and 1 to 10% of a primary wetting agent based on the weight of polytetrafluoroethylene. It may contain an ancillary wetting agent as well. Examples of wetting agents which are suitable are the sodium salt of sulfuric acid ester of monohydric alcohols comprising predominantly lauryl alcohol and octyl phenyl polyglycol ether. Ancillary dispersing agents are for example the butyl amine salt of dodecyl benzene sulfonic acid and the like.

The braided glass fibers are then immersed in the polytetrafluoroethylene dispersion for periods of about 10 seconds to 10 minutes, preferably 15 seconds to 5 minutes (depending on the size of the packing), at any suitable temperatures, e.g. generally in the range of 50° to 150° F., so as to impregnate same. Normally, the impregnated braided glass fibers will contain 10 to 50, preferably 30 to 45 wt. percent polytetrafluoroethylene solids based on weight of glass fibers. Thereafter, the impregnated fiber glass braids are subjected to drying. Drying occurs normally at a temperature of about 70° to 250° F. Allowing to stand at room temperature or sweeping with a gas heated to 150 to 200° F. can readily be employed. If desired, the impregnation step may then be repeated and a further drying step utilized.

The polymer impregnated braided glass fibers are then reduced to final size. Preferably this is done by a calendering operation, although other processes, such as a die-forming operation wherein the pressure of the die serves to size the packing, may be employed. The calendering operation forms the packing to its final dimension and smooths or glazes the outer surfaces. It is normally performed in a machine having two rollers on parallel shafts, rotating in opposite directions, and spaced so as to leave a gap equal to the packing size, for the product. Two side plates also spaced as far apart as the packing size, serve to define the braid.

Figure 2:
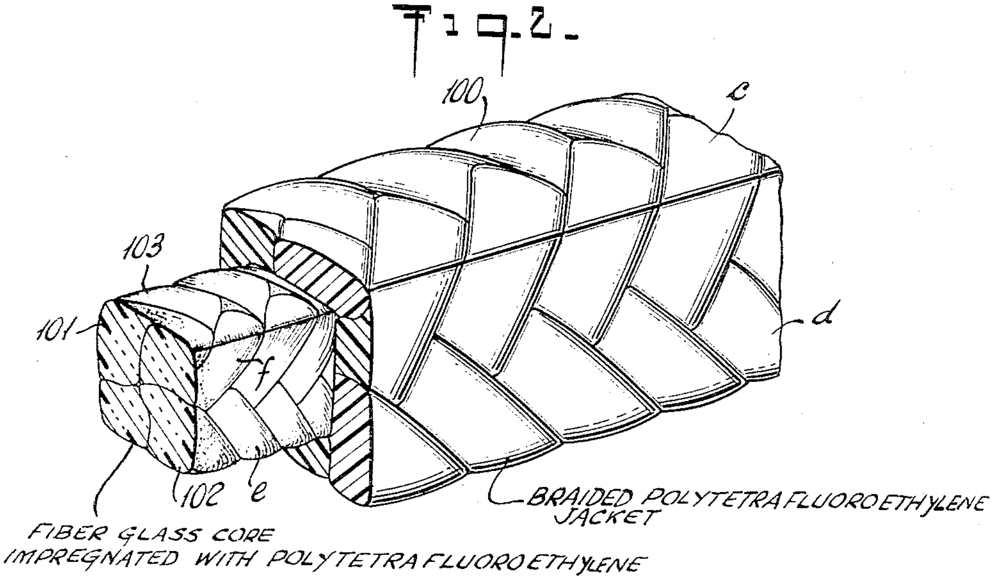
FIG. 2 illustrates a structure wherein a braided glass fiber core impregnated with polytetrafluoroethylene is used in combination with a braided polytetrafluoroethylene jacket to form a packing material.

In making the packing structure illustrated in FIG. 2, wherein the polytetrafluoroethylene impregnated glass filament braids are incapsulated in a braided polytetrafluoroethylene jacket, the following procedure is employed.

Braided glass fibers are impregnated with polytetrafluoroethylene and dried in the manner described above. Thereafter polytetrafluoroethylene filaments are wrapped around the glass fiber core so as to form a braided polytetrafluoroethylene structure thereabout. This is normally done by a braid-over-braid technique wherein a series of braided tubes, one over the other, is utilized with the smaller one braided over the core. Generally, the composite structure is then again immersed in a polytetrafluoroethylene suspension so as to further impregnate the outer braids, the conditions employed being substantially those used in forming the inner core. The resulting packing 100 shown in FIG. 2 thus comprises polytetrafluoroethylene braids *c* and *d* surrounding the basic braided glass fiber core 103 consisting of braided fiber glass 101 impregnated with polytetrafluoroethylene particles 102, letters *e* and *f* designating the braided glass fiber structure.

The following examples illustrate embodiments of this invention and are given by way of illustration only.

EXAMPLE 1

A standard fiber glass staple yarn, identified as Owens-Corning Fiberglas CSE 12.5/1 is employed. The glass fibers have the following composition:

| | Wt. percent to |
|---|---|
| Silicon dioxide | 60/65 |
| Aluminum oxide | 2/6 |
| Boron oxide | 2/7 |
| Sodium potassium oxide | 8/12 |
| Magnesium oxide and calcium oxide | 15/20 |

The individual fibers are 8–15″ long.
The average filament diameter is .000275.

In the construction employed for making ½″ square braided packing, the single ply arrangement of 5 single twisted strands (the strand count being 12,000 yards per pound) as secured from the fiberglass manufacturer, is used. 39 of these strands are twisted into a bundle and wound on each of 8 bobbins. These are then square-braided on an 8 braider machine creating a structure roughly square in cross-section and approximately ½″ in dimension.

The braided glass fibers are immersed in a polytetrafluoroethylene ("Teflon") dispersion identified as TD–3 by Du Pont which contains approximately 60% by weight Teflon, 6% (by weight of Teflon) wetting agent and the remainder, water. For ½″ packing, the time of immersion is two minutes. The packing is then air-dried and calendered to size.

EXAMPLE 2

The following illustrates the use of a braid polytetrafluoroethylene jacketed construction for a ½″ diameter packing:

A standard fiber staple yarn as described in Example 1 is employed for the construction of a ¼″ core. Eleven yarns, as previously described, are twisted into a bundle and wound on a bobbin. Eight such bobbins on a square braider machine produce a core roughly square and ¼″ on the side. The core is then dipped for a period of approximately one minute in a batter consisting of the Teflon suspensoid TD–3 previously described and mica indentified as micro mica–C–3000, a product of the English Mica Company. This mica has a theoretical mesh size of 3000 or an average particle size of 5 to 10 microns in diameter by ½ micron in thickness. The composition of the mica is approximately 48% silica, 33% alumina, 10% potash and lesser amounts of other ingredients. The mica and Teflon suspensoid are mixed in equal amounts by volume or approximately 85% suspensoid and 15% mica by weight.

After air-drying the core at ambient temperatures for one day, it is calendered to ¼" square cross-section. The jacket which surrounds this core is made of bleached Teflon TFE fluorocarbon available from the Du Pont Company as No. 4050–540–0 (4050 denier, 540 filament). 28 of these fibers are twisted into a bundle and wound on each of the eight bobbins. Using the previously prepared core as a center, the bundles of Teflon fiber are square braided into the outer jacket for the packing.

The packing assembly is then dipped in the Teflon suspensoid previously described for approximately five minutes. It is allowed to air-dry at ambient temperature for approximately one day and is calendered to its final ½" size.

In general the packing structure of the present invention will comprise 30 to 45 wt. percent polytetrafluoroethylene in the form of impregnation for the braided glass fiber core. Of course, when a polytetrafluoroethylene braided jacket is also employed, the overall packing material will contain a correspondingly greater amount of Teflon as the jacketing material. The impregnating polytetrafluoroethylene polymer is in non-fibrous form and in the uncured state, whereas in the embodiment of FIG. 2 the polytetrafluoroethylene is in a fibrous form.

Having described the present invention that which is sought to be protected is set forth in the following claims.

What I claim is:

1. A packing material comprising a solid uniform braided core formed entirely of braided glass fibers, each of said fibers continuously extending from one end of said core to the opposite end of said core, said braided glass fibers being impregnated with a member selected from a group consisting of polytetrafluoroethylene polymer and monochlorofluoroethylene polymer to form a packing material of good heat transfer characteristics.

2. The article of claim 1, which contains 10 to 50% of a tetrafluoroethylene polymer in a non-fibrous form as the impregnating material.

3. The article of claim 1, which is encased in a jacket of braided fibrous tetrafluoroethylene polymer.

4. A packing material comprising a solid uniform breaded core formed entirely from a plurality of yarns, each of said yarns being formed from a plurality of elongated glass fibers, each of said fibers being twisted to form said yarn, each of said yarn containing said twisted fibers being braided together to form said solid uniform braided core, wherein said elongated fibers extend from one end of said core to the opposite end of said core, said braided core being impregnated with a member selected from the group consisting of polytetrafluoroethylene and monochlorofluoroethylene polymer to form a packing material of good heat transfer characteristics.

5. The process for making an improved packing material which comprises braiding a plurality of elongated glass fibers to form a continuous solid braided structure wherein said glass fibers continuously extend from one end of said structure to the opposite of said structure, impregnating said braided structure with a dispersion containing a member selected from the group consisting of tetrafluoroethylene and monochlorofluoroethylene polymers so as to impregnate the same with said polymer, drying the impregnated structure and reducing it to a desired size.

6. The process of claim 5 wherein said braided structure is impregnated with a dispersion of tetrafluoroethylene polymer.

7. The process of claim 6, wherein the impregnated braided glass fiber structure after drying is reduced to desired size by the use of a calendering step.

8. The process of claim 6, which further comprises forming a braid of glass fibers by initially twisting a group of glass fibers so as to form a twisted bundle, thereafter braiding the twisted bundle and impregnating the resultant structure in a dispersion of polytetrafluoroethylene particles.

9. The process of claim 6, which further comprises encasing the resultant impregnated braided glass structure in a jacket of fibrous polytetrafluoroethylene polymer by overlapping said core with glass fibers so as to form a braid about it.

References Cited by the Examiner

UNITED STATES PATENTS

| | | | |
|---|---|---|---|
| 2,712,509 | 7/1955 | Bieffield | 28—1 |
| 2,764,506 | 9/1956 | Piccard | 28—1 |
| 2,930,106 | 5/1960 | Wrotnowski et al. | 28—1 |
| 3,124,032 | 3/1964 | Webster et al. | 87—1 |
| 3,196,737 | 7/1965 | Wilkinson | 87—6 |

FRANK J. COHEN, *Primary Examiner.*

J. PETRAKES, *Assistant Examiner.*